METHOD AND APPARATUS FOR PLATING ETCHED HALF-TONE PRINTING PLATES

Filed June 25, 1963 3 Sheets-Sheet 1

INVENTOR:
THOMAS K. ALLISON

BY Howson & Howson

ATTYS.

Dec. 20, 1966 T. K. ALLISON 3,293,156

METHOD AND APPARATUS FOR PLATING ETCHED HALF-TONE PRINTING PLATES

Filed June 25, 1963 3 Sheets-Sheet 2

INVENTOR
THOMAS K. ALLISON
BY Howson & Howson
ATTYS.

Dec. 20, 1966 T. K. ALLISON 3,293,156
METHOD AND APPARATUS FOR PLATING ETCHED HALF-TONE PRINTING PLATES
Filed June 25, 1963 3 Sheets-Sheet 3
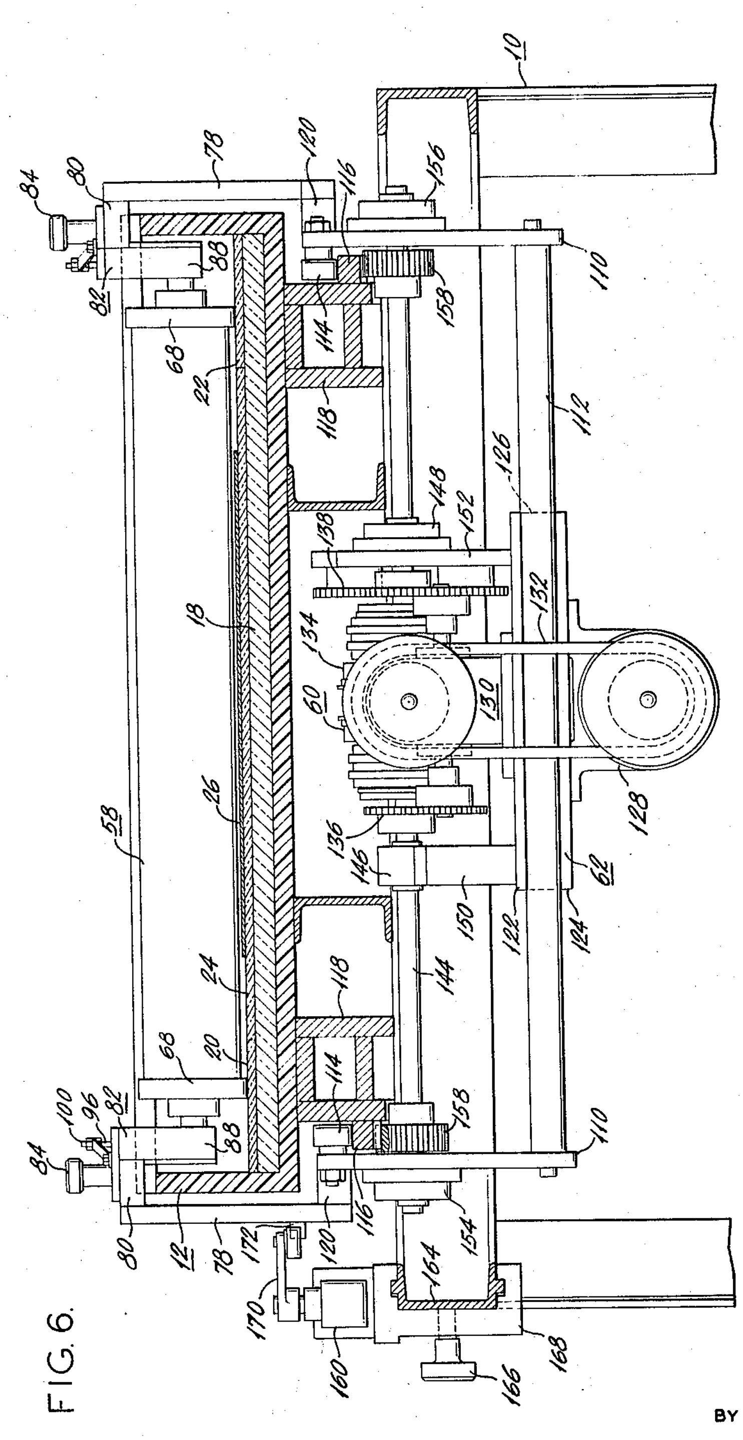
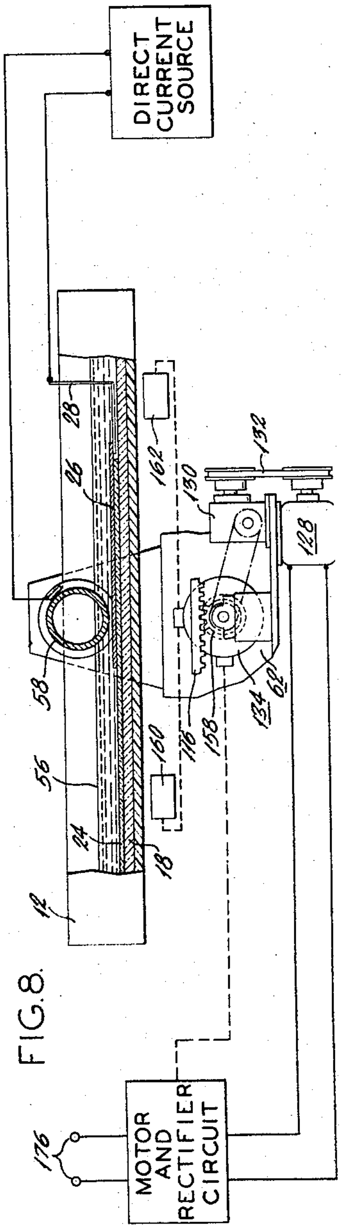
FIG. 6
FIG. 8
INVENTOR:
THOMAS K. ALLISON
BY Howson & Howson
ATTYS.

United States Patent Office 3,293,156

Patented Dec. 20, 1966

3,293,156

METHOD AND APPARATUS FOR PLATING ETCHED HALF-TONE PRINTING PLATES

Thomas K. Allison, Moorestown, N.J., assignor to The Beck Engraving Company, Inc., Philadelphia, Pa., a corporation of Pennsylvania Filed June 25, 1963, Ser. No. 290,399

13 Claims. (Cl. 204—17)

The present invention relates to electroplating apparatus for automatically plating half-tone printing plates as a step in a process for effecting an improved contrast of the etched half-tone plate image, and method of electroplating.

The method is known in the art by which the contrast of a half-tone plate image may be improved by including in the processing thereof an electroplating step following the initial etch to deposit a metal plating layer on the etched cavities of the plate. The thickness of the metal layer precipitated on a given etched half-tone cavity is dependent on the relative size of the cavity, a smaller cavity receiving an increased current density and thus a heavier deposit than would be deposited in a larger cavity. Upon subsequent etching, the electro-deposited metal is etched away at a uniform rate and the shadow areas of the plate, which have smaller cavities and a greater thickness of deposited metal, are etched away last. The high-light areas of the plate, namely those areas of approximately 50 percent and less of the printing tone have all of the electro-deposited copper etched away and also a portion of the original copper plate. Thus there is produced a tonal reduction from approximately 50 percent on down in the high-light areas of the plate and very little if any tonal reduction from 50 percent on up to the solid areas, so that the electroplating step in effect provides an increased image contrast by placing in the path of the etch a metal layer having a depth varying inversely with the size of the cavity.

The above-described method in its most refined form is characterized by an electroplating step in which the anode is spaced a small fraction of an inch from the plate, for example, one-eighth of an inch or less. Such a close spacing of the anode produces a desired higher current density in the dark areas of the plate (small cavities) as contrasted with the light plate areas (large cavities). In addition, the closer spacing provides a substantially higher current density at the edges of the cavities which, particularly in the dark plate areas, causes a desirable buildup of metal around the cavity edges.

Heretofore, apparatus designed for carrying out the described process has been of two general types. In the first type the anode is covered with a fluid-permeable pad of the desired thickness to maintain the anode in spaced relation to the printing plate. The anode is manually moved over the plate with the pad in contact with the plate surface. A second type of apparatus comprises a stationary anode secured in spaced disposition from the printing plate.

There are several disadvantages of the above types of equipment. With the first type the spacing pad cannot be relied upon to provide a sufficiently accurate and uniform spacing of the anode from the plate, and since the pad engages the plate particles that become embedded in the pad may scratch the plate. The pad furthermore interferes with the uniform circulation of electrolyte. In addition to the above factors, the necessity of manually moving the apparatus across the plate prevents the precipitation of a uniform and predetermined plating layer on the plates and the results of the process as carried out with such equipment are unpredictable.

The second type of apparatus cannot be considered satisfactory due to the difficulty of maintaining the electrolyte in uniform strength between all areas of the anode and the plate. It is very difficult in any static anode system to obtain the required uniformity of electrolyte solution and current density at the very close spacing of the anode and cathode which is employed. When electroplating at the high current density necessary to accomplish the differential buildup of electro-deposited metal, the cathode film is rapidly depleted of copper ions and uniformity of the electrolyte solution obtained, for example, by continuous agitation, is necessary to replenish this film. In addition, uneven wearing of the stationary anode would necessitate a frequent replacement of this element.

From the above it can be understood that the described process for increasing the contrast of half-tone printing plates and the carrying out of the electroplating step thereof with a closely spaced anode have not been adaptable to large scale plate production due to the disadvantages inherent in previously designed process equipment and the expense of operating such equipment.

It is accordingly a first object of the present invention to provide an electroplating apparatus for plating etched half-tone printing plates in a fully automatic, uniform, and predetermined manner.

A further object of the invention is to provide an electroplating apparatus as described having a roller anode closely spaced from the printing plate, the anode rotating and moving continuously with respect to the plate at a uniform rate to insure a uniform exposure of the plate to the anode.

An additional object is to provide an electroplating apparatus as described wherein the roller anode by continuous movement across the printing plate produces a wave-type agitation of the electrolyte solution to insure a uniform-strength solution between the anode and the plate.

Additional objects and advantages of the invention will be more readily apparent from the following detailed description of an embodiment thereof when taken together with the accompanying drawings in which:

FIG. 6 is a sectional view taken along line 6—6 of FIG. 3;

FIG. 8 is a schematic view showing the basic electrical circuits involved in the apparatus.

Figure 1:
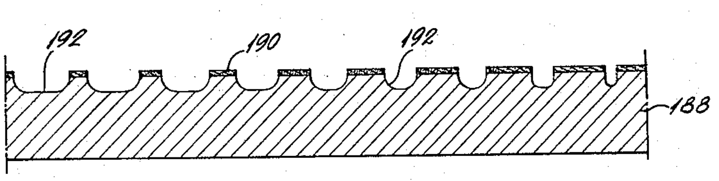
FIG. 1 is a greatly enlarged sectional view of a half-tone printing plate following an initial etch, the plate as viewed from left to right showing a gradually decreasing cavity size characterizing progressively darker plate areas.

Referring to the drawings, the embodiment of the invention illustrated includes a frame 10 supporting a plating tank 12 at a convenient level. The tank is preferably made of plastic or other suitable non-corrosive material which will not be subject to electrolytic action. Strips 14 and 16 partially covering the ends of the tank prevent solution from splashing out of the tank during operation of the apparatus.

Figure 5:
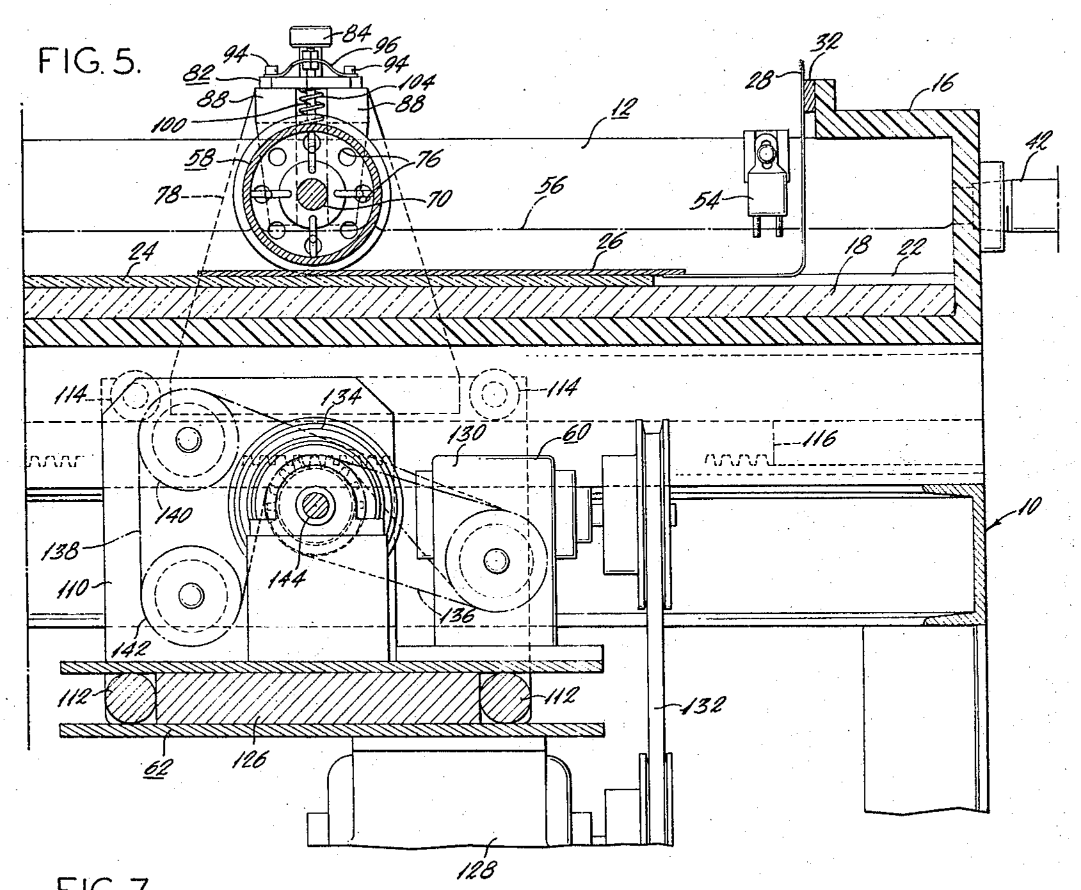
FIG. 5 is a sectional view taken along line 5—5 of FIG. 4.
Figure 7:
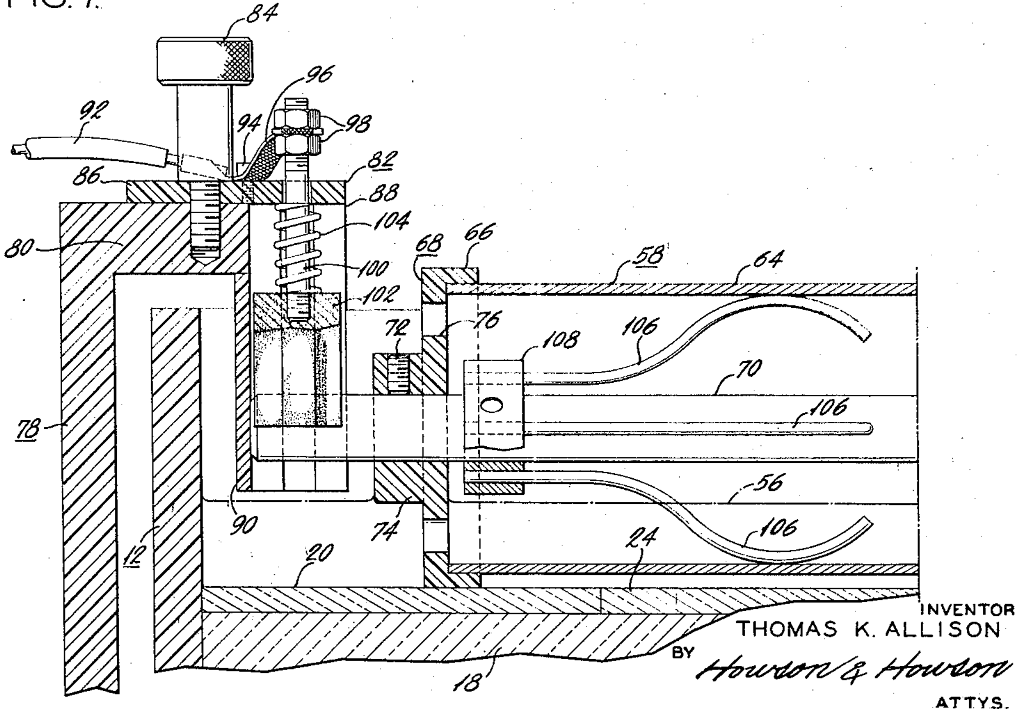
FIG. 7 is a sectional view taken along line 7—7 of FIG. 3 showing the manner in which the power source is connected with the anode.

As seen most clearly in FIGS. 5–7 a sheet of plate glass 18 is fitted within the bottom of the tank extending substantially to the sides and ends thereof. A second layer of glass laid directly on sheet 18 includes side strips 20 and 22 extending to the ends of the tank and a central plate-supporting sheet 24 fitted between the side strips 20 and 22. The central sheet 24 does not extend to the ends of the tank for reasons presented below. A copper printing plate 26 having an etched half-tone image 27 on the upper surface thereof is positioned on the glass sheet 24 with one edge extending over the edge of the sheet 24 permitting attachment of a copper strip 28 to the bottom of the plate in the manner shown in FIG. 5. The strip is secured by a spring clamp 30 to a cathode bus bar 32 extending across the inner edge of the cover strip 16.

Figures 3, 4:
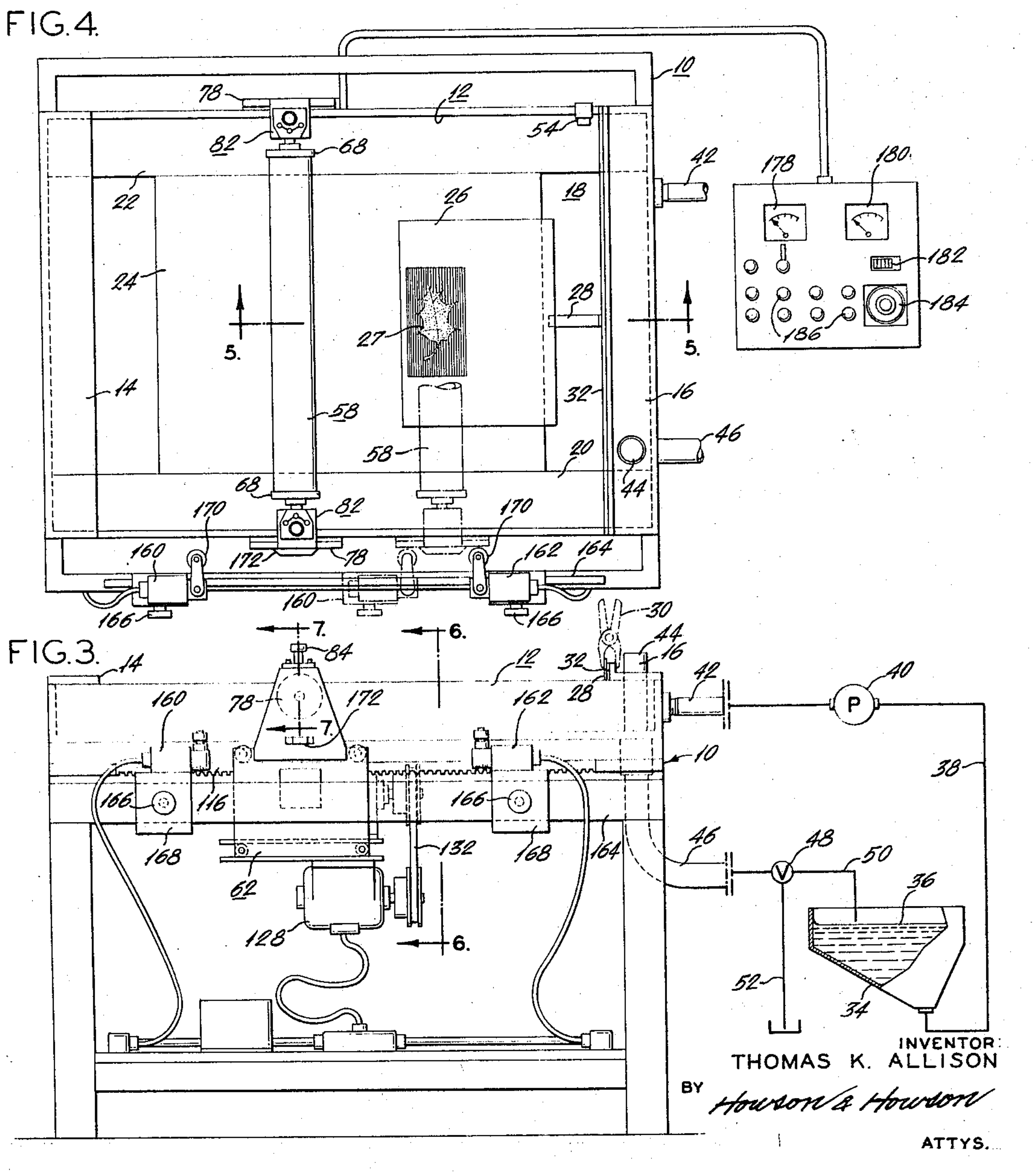
FIG. 3 is a side elevational view of apparatus in accordance with the present invention including a schematic showing of the electrolyte transfer means.
FIG. 4 is a plan view of the apparatus shown in FIG. 3 including a control panel of a type suitable for automatic control of the machine elements.

As shown in FIG. 3, a reservoir 34 which may be positioned remote from the plating apparatus is provided for storage of the electrolyte solution 36. Solution is transferred from the reservoir to the plating tank 12 through conduit 38 and inlet 42 by pump 40. The plating tank may be drained by removal of the threaded vertical plug 44, permitting the solution to pass through drain pipe 46 into valve 48 which may be selectively set to return the solution to the reservoir through conduit 50 or to divert the flow to waste through conduit 52. As shown in FIG. 5, a probe type level control 54 is positioned along the plating tank edge and is connected with the pump 40 to maintain the electrolyte solution at the desired level 56 in the plating tank.

As shown most clearly in FIG. 6, a roller anode 58 is driven in reciprocation within the plating tank 12 by a traversing mechanism 60 mounted on a carriage 62 beneath the plating tank. Referring to FIG. 7, the roller anode consists primarily of a length of copper pipe 64 which is held in spaced relationship from the plate-supporting sheet 24 by flanges 66 of plastic wheels 68 on the pipe ends. A shaft 70 passes through the roller anode and the wheels 68 are secured to the shaft by screws 72 in wheel collar portions 74. Holes 76 in the wheel permit electrolyte to circulate within the anode.

The wheels 68 bear on the glass strips 20 and 22 and the roller anode is thus supported on the same level surface as the printing plate. The spacing of the anode above the plate, which as indicated above is of critical importance, is determined by the thickness of the wheel flanges 66 and is preferably 0.125 inch.

The roller anode is connected with the carriage 62 by means of upper carriage side plates 78 to which are secured inwardly directed drive blocks 80. Shaft guide and brush holder assemblies 82 are demountably secured to the drive blocks 80 by means of knurled hand screws 84. The screws 84 pass through brush carrier plates 86 to which the shaft guide and brush holder elements are attached. The assemblies 82 include, in addition to the brush carrier plates 86, downwardly extending drive fingers 88 which, as shown in FIG. 5, are secured to the carrier plates in spaced disposition to permit rotation of the shaft 70 therebetween. Cover plates 90 on the outer side of the drive fingers maintain the lateral disposition of the roller anode by preventing longitudinal movement of the shaft. The cover plates 90 also complement the hand screws 84 in securing the assemblies 82 to the drive blocks since the cover plates pass under the drive blocks, preventing upward movement of the attached assemblies.

Current from the direct current source is passed into the anode through wire leads 92 which terminate at bolts 94 on the brush carrier plates. Flexible woven wire conductors 96 extending from the bolts 94 are clamped by nuts 98 to threaded copper brush rods 100. The brush rods pass through the brush carrier plates and the lower ends of the rods are in threaded engagement with carbon brushes 102. The brushes are held in contact against the ends of the shaft 70 by springs 104 in compression between the brushes and the brush carrier plates.

Current is passed from the shaft 70 to the copper pipe 64 by metallic spring fingers 106 secured to the shaft within the roller anode by collar 108.

Referring to FIGS. 5 and 6, the reciprocating carriage 62 includes lower carriage side plates 110 which are held in spaced vertical disposition by cross rods 112 bolted therebetween. Cam followers 114 extending interiorly from the upper edges of the lower carriage side plates bear on the smooth upper surface of gear rack 116 mounted on the outer face of vertical framing member 118. The upper carriage side plates 78 are outwardly offset from the lower carriage side plates 110 by spacing blocks 120.

The traversing mechanism 60 which reciprocates the carriage 62 is mounted on upper and lower base plates 122 and 124 which centrally cap the cross rods 112. Block 126 is sandwiched between the base plates to further strengthen the carriage in this region.

An electric motor 128 secured to the underside of the lower base plate 124 drives a reduction gear unit 130 on the upper base plate 122 by means of a belt or chain drive 132. Power is transmitted from the reduction gear unit to both sides of an electrically actuated duplex clutch 134 by drive chain 136 and reversing drive chain 138, the latter chain passing over idler sprockets 140 and 142 to provide a reversing drive effect.

The duplex clutch 134 is mounted on drive shaft 144 which is journalled on pillow blocks 146 and 148 supported above the upper base plate by supports 150 and 152. The drive shaft extends through the lower carriage side plates 110 wherein it is journalled by bearings 154 and 156.

Gears 158 secured to the drive shaft adjacent the lower carriage side plates 110 coact with the gear racks 116 to propel the carriage along the racks. The extent of travel of the carriage and roller anode is controlled by limit switches 160 and 162 which may be selectively positioned on the keyed frame member 164 by means of adjusting screws 166 in the limit switch slides 168. The trip arms 170 of the limit switches are triggered by trip block 172 mounted on the side of an upper carriage side plate.

Referring to FIG. 8 of the drawings, the necessary electrical connections are schematically illustrated and include a source of direct current, the positive pole of which is connected with the roller anode in the manner described above. The negative pole is connected with the cathode bus bar 32. An alternating current source 176 supplies power for the motor 128 as well as a rectifier which provides direct current for the duplex clutch elements. The limit switches 160 and 162 are connected with the duplex clutch as indicated and serve to reverse the polarity of the clutch, thus reversing the direction of travel of the carriage and roller anode.

The apparatus may be equipped with a control panel such as that illustrated in FIG. 4 which includes such instruments as an ammeter 178 and voltmeter 180 for measuring the electroplating current characteristics, counter 182 to record the number of carriage reciprocations, a dial type automatic selector switch 184 for presetting the desired number of reciprocations of the roller anode, and various control switches and lights 186 for individually controlling various elements of the mechanism. Although the arrangement of such a central control panel may be varied as desired, the presently illustrated arrangement indicates the manner in which the apparatus may be instrumented for automatic operation.

For operation, a plate is positioned in the manner illustrated on the glass sheet 24 overhanging the edge of the sheet so that the copper strip 28 may be secured beneath the plate. The copper strip is attached to the cathode bus bar with a spring clamp. The drain plug 44 is placed in position and electrolyte 36 is pumped into the plating tank until the desired solution level 56 has been reached. The solution level is preferably of such a depth as to immerse ¼ to ⅓ of the roller anode in the electrolyte. The level control 54 connected with the pump 40 is positioned to maintain the proper solution level. The limit switches 160 and 162 are set to provide the desired path of reciprocation of the roller anode, as shown for example in broken lines in FIG. 4 of the drawings.

In the plating operation, direct current is passed into the roller anode to effect an electrolytic action and deposit a fine metallic layer upon the etched cavities of the printing plate. The electric motor 128 is actuated and the carriage is reciprocated by means of the duplex clutch which is reversed at the ends of the stroke by the limit switches 160 and 162. As the roller anode reciprocates back and forth in the electrolyte and in predetermined spaced relation to the surface of the printing plate, a wave-type agitation of the electrolyte solution is produced which performs the important function of maintaining the electrolyte in continuous movement between the anode and plate so that uniformity in the electrolyte solution in contact with the plate is assured throughout the plating process.

Reciprocation of the roller anode in this manner continues automatically until the plating process has been completed. The electrolyte is then drained from the plating tank by removal of the plug 44 and may either be returned to the reservoir or discharged to waste by means of the valve 48.

Excellent results have been obtained using a 3" roller anode spaced ⅛ of an inch above the printing plate and an electrolyte comprising 30 ounces of copper sulphate and 3 ounces of sulfuric acid to a gallon of water. Under these conditions, a voltage of from 1.6 volts to 2.8 volts was employed across the anode and plate cathode depending upon the area of the plate and the residual photo-resist to effect the electroplating action, a suitable deposit being precipitated after approximately 100 to 125 passes of the roller anode over the plate.

Figure 2:
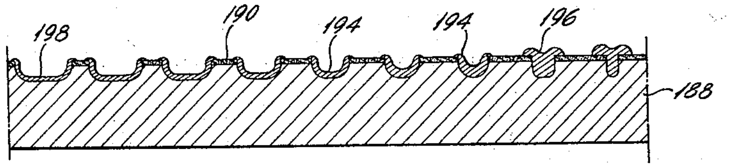
FIG. 2 is a view as in FIG. 1 showing the plate following the electroplating step.

The plating effect produced by the described process is shown in FIGS. 1 and 2, FIG. 1 showing a half-tone printing plate in greatly magnified section as it appears following an initial etch. The plate consists of a copper plate 188 having an enamel resist layer 190, the initial etch having eaten cavities 192 into the plate 188 in the regions unprotected by the resist layer. The plate in the condition shown in FIG. 1 is electroplated in the manner described above and upon completion of the electroplating step has the appearance shown in FIG. 2 with copper deposits 194 formed in the cavities 192. It may be seen that the deposits are considerably heavier in the smaller cavities such as 196 than in the larger cavities such as 198 due to the above described variations in current density which are dependent upon the size of the cavities. In view of the varying depth of the deposits, it can thus be understood that upon subsequent etching the contrast between the light and dark areas of the plate will be improved as a result of the electroplating step.

The present apparatus permits the electroplating operation to be carried out in a completely automatic manner with the precipitation of a uniform and predetermined layer on the plate cavities. It is thus possible to carry out such an operation efficiently and inexpensively since the apparatus need not be operated by a skilled photoengraver and a number of plates can be processed simultaneously.

The effectiveness of the electroplating apparatus lies in part in the continual agitation of the electrolyte solution provided by the reciprocating movement of the roller anode. This causes continuous motion of the solution and insures a uniform strength electrolyte between the anode and plate during all phases of the operation.

The roller anode may be quickly and cheaply replaced by substituting a new length of copper pipe into the assembly when replacement is necessary. The roller anode as well as the shaft guide and brush holder assemblies are readily disassembled by removal of the two hand screws 84 from the drive blocks 80. This permits inspection and replacing of the brushes and copper pipe and facilitates cleaning of the plating tank.

The broad concept of the invention may be embodied in apparatus similar to that shown but in which the printing plate and tank reciprocate with respect to a stationarily positioned, rolling cylindrical anode. In such an alternate construction, the agitation of the electrolyte and the resultant uniform plating action would be effected in the same manner as in the illustrated apparatus.

A further alternate construction would incorporate a plurality of roller anodes to improve the rate of precipitation of the copper layers. The manner of operation and the advantageous results of such an arrangement would in other respects be identical with those presented above.

Manifestly, changes in details of construction can be effected by those skilled in the art without departing from the spirit and the scope of the invention as defined in and limited solely by the appended claims.

I claim:

1. Electroplating apparatus for plating etched half-tone printing plates, comprising a plating tank adapted for immersion of a printing plate in an electrolyte solution therein, a roller anode disposed within said tank in closely spaced relation to the printing plate and positioned to be at least partially immersed in the electrolyte solution in said tank, said roller anode being mounted for reciprocation in parallel relation to the printing plate, means for passing an electric current to and across the roller anode and printing plate to effect an electrolytic deposit upon the etched cavities of the printing plate, and means for reciprocating said roller anode back and forth over the entire surface area of the printing plate to cause a wave-like agitation of the electrolyte solution and provide a uniform solution thereof between the entire area of the printing plate and the roller anode throughout a plating operation.

2. Electroplating apparatus for plating etched half-tone printing plates comprising, a plating tank adapted to contain an electrolyte solution, means for supporting a printing plate in said plating tank immersed in the electrolyte solution, a roller anode in said plating tank adapted to roll in closely spaced parallel relation to the printing plate and positioned to be at least partially immersed in the electrolyte solution in said tank, means for reciprocating said roller anode within said tank back and forth over the entire surface area of the printing plate to cause a wave-like agitation of the electrolyte solution and maintain uniformity of the solution between the entire area of the printing plate and the roller anode throughout a plating operation, and means for passing an electric current to and across said roller anode and printing plate during reciprocation of the anode to effect an electrolytic deposit upon the etched half-tone cavities of a printing plate in a controlled, predetermined manner.

3. Electroplating apparatus for plating etched half-tone printing plates comprising a frame, a plating tank secured to said frame and adapted to contain an electrolyte solution, means for supporting a printing plate in said plating tank immersed in the electrolyte solution, a cylindrical anode disposed in said plating tank in closely spaced relation to the printing plate and positioned to be at least partially immersed in the electrolyte solution in said tank, means on said frame for reciprocating said cylindrical anode in closely spaced parallel relation to the printing plate back and forth over the entire surface area of the printing plate to cause a wave-like agitation of the electrolyte solution and maintain uniformity of the solution between the entire area of the printing plate and the roller anode throughout a plating operation, means for rotating said cylindrical anode during reciprocation thereof, and means for passing an electric current to and across the cylindrical anode and printing plate to effect an electrolytic deposit upon the etched half-tone cavities of the printing plate in an automatic, controlled manner.

4. Electroplating apparatus for plating etched half-tone printing plates comprising a frame, a plating tank secured to said frame, means for supporting a printing plate in said plating tank, a cylindrical roller anode disposed in said plating tank in closely spaced parallel relation to the printing plate, a reciprocable carriage on said frame, means mounting said roller anode on said carriage for reciprocation therewith, means for filling said plating tank with an electrolyte solution to cover the printing plate and at least partially immerse said roller anode, means to apply direct current from said roller anode through the electrolyte solution to the printing plate to plate the etched half-tone cavities of a printing plate, and means for reciprocating said carriage and roller anode back and forth over the entire surface area of the printing plate to cause a wave-like agitation of the electrolyte solution and provide a uniform solution of the electrolyte between the entire area of the printing plate and the roller anode throughout a plating operation.

5. Electroplating apparatus for plating etched half-tone printing plates comprising a frame, a plating tank secured to said frame, a support in said tank for a printing plate in said tank, a carriage mounted on said frame for linear movement parallel to the printing plate, a cylindrical roller anode on said carriage and movable therewith in closely spaced relation to the printing plate, means for filling said plating tank with an electrolyte solution to cover the printing plate and at least partially immerse said roller anode therein, means to supply direct current from said roller anode through the electrolyte solution to the printing plate to plate the etched half-tone cavities of the printing plate, and traversing mechanism on said carriage operatively engaging said frame to effect reciprocating movement of said carriage and said roller anode with respect to the printing plate, said roller anode being uniformly spaced from the printing plate on said sheet during reciprocation thereof and causing a wave-like agitation of the electrolyte solution to provide a uniform solution of electrolyte between the entire area of the printing plate and the roller anode throughout a plating operation.

6. Electroplating apparatus as claimed in claim 5, wherein said roller anode comprises a cylindrical member provided with wheels which roll on the support for the printing plate to maintain the anode member at a uniform closely spaced distance from the printing plate positioned on said support.

7. Electroplating apparatus as claimed in claim 6 wherein the wheels are perforated to permit electrolyte to circulate within the anode member.

8. Electroplating apparatus as claimed in claim 7, wherein the means connecting the roller anode to the carriage comprises a shaft passing through the wheels of said roller anode and extending beyond the ends thereof, drive fingers on said carriage engaging the extending ends of said shaft to permit rotation of said shaft ends therebetween, brush means between said fingers biased against said shaft ends, and spring fingers secured to said shaft within said anode in biased engagement therewith whereby direct current may pass to said brush means through said shaft and spring fingers to said anode.

9. Electroplating apparatus as claimed in claim 5, wherein the traversing mechanism comprises a rack on said frame, a drive shaft on said carriage, a gear mounted on said drive shaft coacting with said rack, a magnetic duplex clutch on said drive shaft, an electric motor driving the drive elements of said clutch in opposed directions, and limit switches adjustably mounted on said frame for engagement by said carriage for controlling said clutch and thereby effecting reciprocating movement of said carriage having a stroke of predetermined extent.

10. In the method of electroplating etched half-tone printing plates by passing an electric current from an anode through an electrolyte solution to a cathode printing plate, the steps which comprise fixedly positioning an etched cathode printing plate with the plane of its etched surface disposed in closely spaced relation to a roller anode, immersing the cathode printing plate in an electrolyte solution in which the roller anode is also at least partially immersed, traversing the roller anode at a constant speed in said electrolyte solution back and forth over the surface area of the cathode printing plate in said closely spaced relation thereto to effect a uniform wave-like agitation of the electrolyte solution and thereby maintain the electrolyte solution continuously uniform between the traversing anode and the cathode printing plate, and passing an electric current from the traversing anode to the electrolyte solution to the cathode printing plate for a predetermined period of time to effect an electrolytic deposit upon the etch half-tone cavities of the cathode printing plate.

11. The steps in the method claimed in claim 10 wherein the space between the roller anode and surface of the cathode printing plate does not exceed one-eighth inch.

12. The steps in the method claimed in claim 10 wherein the roller anode is rotated continuously during traverse thereof relative to the cathode printing plate.

13. The steps in the method claimed in claim 10 wherein the space between the roller anode and surface of the cathode printing plate does not exceed one-eighth inch, and the roller anode is rotated continuously during traverse thereof relative to the cathode printing plate.

References Cited by the Examiner

UNITED STATES PATENTS

| | | | |
|---|---|---|---|
| 1,434,798 | 11/1922 | Stafford | 204—17 X |
| 1,974,140 | 9/1934 | Irion et al. | 204—212 X |
| 2,355,530 | 8/1944 | Hawley | 101—401.3 |
| 2,540,602 | 2/1951 | Thomas et al. | 204—15 |
| 2,689,215 | 9/1954 | Bart | 204—26 |
| 2,710,786 | 6/1955 | Tyler | 204—2 |
| 3,239,441 | 3/1966 | Marosi | 204—143 |

JOHN H. MACK, *Primary Examiner.*

W. VANSISE, *Assistant Examiner.*